United States Patent [19]

Playfoot et al.

[11] 4,237,380
[45] Dec. 2, 1980

[54] SELF-POWERED RADIATION DETECTOR WITH INSULATED INNER AND OUTER COLLECTOR ELECTRODES

[75] Inventors: Kerwin C. Playfoot, Horseheads, N.Y.; Norman P. Goldstein, Murrysville, Pa.

[73] Assignee: Westinghouse Electric Corp., Pittsburgh, Pa.

[21] Appl. No.: 919,573

[22] Filed: Jun. 27, 1978

[51] Int. Cl.² .......................... G01T 1/24; G01T 3/00
[52] U.S. Cl. .................................. 250/370; 250/390
[58] Field of Search ............... 250/370, 390, 391, 392; 313/61 D

[56] References Cited

U.S. PATENT DOCUMENTS

| 3,259,745 | 7/1966 | Garlick et al. | 250/392 |
| 3,375,370 | 3/1968 | Hilborn | 250/370 |
| 3,603,793 | 8/1969 | Warren | 250/370 |
| 3,787,697 | 1/1974 | Shields | 250/390 |
| 3,872,311 | 3/1975 | Goldstein et al. | 250/390 |
| 3,903,420 | 9/1975 | Klar | 250/390 |
| 3,940,627 | 2/1976 | Klar | 250/390 |
| 3,986,032 | 10/1976 | Klar et al. | 250/390 |
| 4,008,399 | 2/1977 | Brown | 250/390 |
| 4,080,311 | 3/1978 | Kehl | 252/437 |
| 4,118,626 | 10/1978 | Goldstein et al. | 250/370 |

FOREIGN PATENT DOCUMENTS 2461211  6/1976  Fed. Rep. of Germany ........... 250/390

Primary Examiner—Alfred E. Smith
Assistant Examiner—Carolyn E. Fields
Attorney, Agent, or Firm—W. G. Sutcliff

[57] ABSTRACT

A self-powered radiation detector of improved sensitivity is provided by having a tubular emitter electrode, with an inner collector electrode coaxial within the tubular emitter and insulated therefrom, and an outer tubular collector electrode coaxial about and insulated from the tubular emitter. The inner and outer collector electrodes are electrically connected.

4 Claims, 2 Drawing Figures

SELF-POWERED RADIATION DETECTOR WITH INSULATED INNER AND OUTER COLLECTOR ELECTRODES

BACKGROUND OF THE INVENTION

The present invention relates to self-powered radiation detectors such as are used for nuclear reactor in-core radiation monitoring. The term self-powered detector indicates that no external drive potential is required for operation of the detector, as is the case for ion-chamber or other such more conventional radiation detector. Self-powered detectors typically have a compact rugged, small diameter, tubular structure which is easily incorporated in the reactor core.

The prior art self-powered detector designs are basically a coaxial design with a center conductor termed the emitter electrode insulated from a tubular outer conductor termed the collector electrode. The emitter and collector electrodes are formed of different materials which have significantly different responses or interactions with radiation flux, which in a reactor can be neutron flux or gamma flux. The emitter and collector electrode materials are selected for their relative neutron or gamma flux interaction capabilities. A neutron responsive self-powered detector is described in U.S. Pat. No. 3,940,627, with a metal layer about a cylindrical emitter electrode. The metal layer is relatively neutron insensitive and the metal layer and the emitter are electrically common, and this structure reduces the effect of interfering signals which are not neutron flux related. In U.S. Pat. No. 4,008,399 a radiation detector is described with two concentric, tubular collector electrode portions which serve to provide a gamma compensated device.

The significant advantage of a self-powered detector is its long life reliability capability over prior art radiation detectors, but self-powered detectors have a generally lower sensitivity, which has limited their usage. It is generally desired to increase the sensitivity of self-powered detectors.

SUMMARY OF THE INVENTION

The sensitivity of self-powered radiation detectors can be significantly improved by a detector structure in which a tubular emitter electrode is insulated from a central conductive electrode and an outer coaxial tubular conductive electrode, which central and outer tubular conductive electrodes are electrically connected and serve as the collector electrode of the detector. The collector central conductive electrode portion collects charge moving inward from the tubular emitter to induce current in the emitter-collector circuit. This current adds to the conventional self-powered detector current caused by the flow of charge outward from the emitter to the outer tubular collector electrode portion. In this way, the signal sensitivity is several times higher than for the conventional self-powered design.

DESCRIPTION OF THE PREFERRED EMBODIMENT

Figure 1:
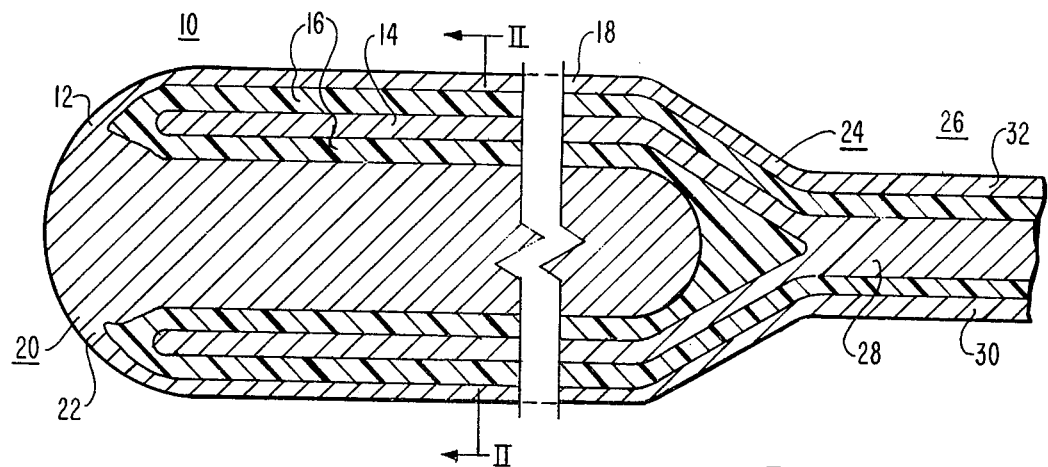
FIG. 1 is a side elevation view in section of a self-powered radiation detector per the present invention.
Figure 2:
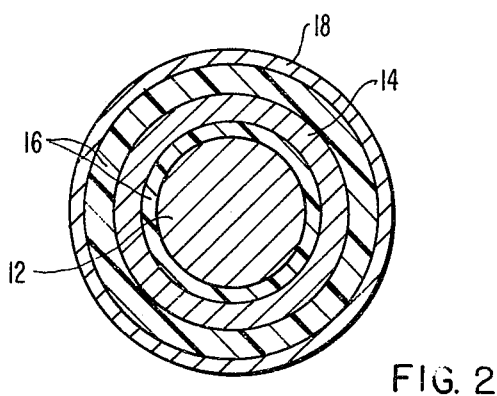
FIG. 2 is a cross sectional view taken through the detector of FIG. 1 along line II—II.

The invention can be best understood by reference to the exemplary embodiment seen in FIGS. 1 and 2. The self-powered radiation detector 10 is an elongated generally cylindrical member which is hermetically sealed and electrically connected at one end to coaxial cable 26 which is run to a reactor control location where the cable conductors are connected to a highly sensitive ammeter. The signal current which is indicative of the radiation flux level at the self-powered detector location is read as an ammeter current, with or without signal compensation means or amplifiers.

The self-powered detector 10 comprises a central conductive collector electrode portion 12, with a tubular conductive emitter electrode 14 spaced coaxially about the central conductive collector electrode portion 12. Insulating means 16 are disposed about the central conductive collector electrode 12 and about the tubular conductive emitter electrode 14. A tubular conductive outer collector electrode portion 18 is coaxially disposed about and spaced from the tubular emitter 14 by the insulating means 16. The insulating means 16 effectively spaces and insulates the emitter and collector electrode portions.

One end 20 of the detector 10 comprises a hermetically sealed off outer collector end portion 22, with the central conductive collector electrode portion 12 electrically connected to the outer collector electrode portion 18 at the sealed off outer collector end portion 22.

The other end portion 24 of the detector 10 is hermetically sealed and electrically connected to coax electrical cable 26 comprising a center conductor 28 electrically connected to the tubular emitter 14, and an outer tubular sheath 30 which is coaxially spaced and insulated from the cable center conductor 28. The outer tubular sheath 30 is electrically connected and hermetically sealed to the outer tubular collector electrode 18. Cable insulating means 32 is disposed between the cable center wire 28 and the cable outer tubular sheath 30.

The detector design of the present invention, with the inner and outer collector electrode portions is of advantage for neutron flux or gamma flux detectors, the difference between such detectors usually being the choice of emitter conductive material. Thus, for neutron flux detection the tubular emitter is preferably formed of a high neutron cross section material such as rhodium, vanadium or cobalt. For gamma flux detector application, the tubular emitter is formed of low neutron cross section, high atomic weight and high density material such as platinum.

The insulating means 16 is preferably densely compacted, radiation and high temperature resistant insulating material such as aluminum oxide or magnesium oxide. The collector electrode portion, both the central conductor and the tubular outer conductor are formed of the same material which has a significantly different radiation response than the emitter material for either a neutron or gamma flux detector. The collector electrode portions are preferably formed of a high temperature resistant, low neutron cross section material, such as one of the high nickel content steels, such as Inconel, or nickel-chrome stainless steel. Inconel is a trademark of the International Nickel Co.

The typical self-powered detector of the present invention has an outside diameter for the tubular outer collector electrode of from about 0.080 to 0.150 inch, with a tubular outer collector wall thickness of about 0.010 to 0.020 inch thick. The tubular emitter electrode has an outside diameter of up to about 0.080 inch with a wall thickness of about 0.005 to 0.010. The center conductor collector electrode portion can be from about 0.005 to 0.050 inch in diameter, with the larger diameter being preferred for a tubular emitter outside diameter of 0.080 inch. The insulating layer between the electrodes should be at least 0.010 for reliable electrical insulation.

The selection of conductive material for the first tubular emitter electrode determines the nature of the radiation flux to which the detector is sensitive to and the application for the detector. Thus, for neutron flux response, the tubular emitter electrode is selected from a material which has a high neutron cross section. For a gamma flux responsive detector the tubular emitter electrode is formed of a high atomic number gamma flux interactive conductive material.

The collector electrode portions including the center conductor portion and the tubular outer portion are typically formed of the same conductive material. This conductive collector material for a neutron responsive design has a low neutron cross-section relative to the emitter material. For a gamma responsive design the collector material has a low atomic number relative to the emitter material.

The insulating means between the center conductor portion and the tubular emitter and the outer tubular collector electrode portion is typically high temperature, radiation resistant, insulating metal oxide, such as aluminum oxide or magnesium oxide. It has been previously suggested, in U.S. Pat. No. 4,118,626, filed Feb. 23, 1977, entitled "A Gamma Flux Responsive Self-Powered Detector," to have the insulating means comprise a vacuum or low density medium with appropriate insulating support means between the emitter and collector. This can be of particular advantage for some applications in detectors of the present invention as well.

We claim:

1. A self-powered radiation detector of a small overall diameter adapted for in-core radiation monitoring in which a radiation flux indicative electrical signal is developed between a spaced apart first emitter electrode and second collector electrode as a result of the differing radiation interactions of the incident radiation flux upon the first emitter electrode and second collector electrode, the first emitter electrode being formed of tubular conductive material, and the second collector electrode consisting of a supporting solid center conductor portion coaxially disposed within the tubular first emitter electrode with insulating means therebetween, and an outer tubular portion disposed coaxially about the tubular first emitter electrode with insulating means therebetween, and wherein the center conductor portion and the outer tubular portion are electrically connected as the second collector electrode.

2. The self-powered radiation detector set forth in claim 1, wherein the first tubular emitter electrode is formed of a high neutron cross section conductive material, and the second collector electrode is formed of low neutron cross section conductive material.

3. The self-powered radiation detector set forth in claim 1, wherein the detector is gamma flux responsive, with the first tubular emitter electrode formed of a high atomic number gamma flux interactive conductive material, and the second collector electrode is formed of a lower atomic number conductive material having lower gamma flux interaction.

4. The self-powered radiation detector set forth in claim 1, wherein the emitter electrode is formed of one of the materials of the group consisting of platinum, rhodium, vanadium, and cobalt, and the collector electrode is formed of one of the materials of the group consisting of high nickel content steel, and nickel-chrome stainless steel.

* * * * *